US011217906B2

(12) United States Patent
Gao et al.

(10) Patent No.: US 11,217,906 B2
(45) Date of Patent: Jan. 4, 2022

(54) CUSTOMER PREMISES EQUIPMENT (CPE), CPE MOUNTING BRACKET, AND CPE SYSTEM

(71) Applicant: HUAWEI TECHNOLOGIES CO., LTD., Shenzhen (CN)

(72) Inventors: Feng Gao, Shanghai (CN); Xiaoliang Wang, Munich (DE); Wei Chen, Dongguan (CN); Xiaojun Peng, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/841,875

(22) Filed: Apr. 7, 2020

(65) Prior Publication Data
US 2020/0235496 A1   Jul. 23, 2020

Related U.S. Application Data

(63) Continuation of application No. PCT/CN2018/109407, filed on Oct. 9, 2018.

(30) Foreign Application Priority Data

Oct. 10, 2017   (CN) .......................... 201710936999.4

(51) Int. Cl.
*H01Q 25/00*   (2006.01)
*H01Q 1/02*   (2006.01)
(Continued)

(52) U.S. Cl.
CPC ............... *H01Q 25/00* (2013.01); *H01Q 1/02* (2013.01); *H01Q 1/2291* (2013.01); *H01Q 1/246* (2013.01); *H04L 12/2898* (2013.01)

(58) Field of Classification Search
CPC ............ H04N 5/2253; H04N 5/23258; H04N 5/2252; H04N 5/2254; H04N 5/2257; H04N 5/23241
See application file for complete search history.

(56) References Cited

U.S. PATENT DOCUMENTS 7,366,553 B1    4/2008  Shields et al.
2012/0243464 A1*  9/2012  Aguirre ................. H04W 84/14
                                              370/316

(Continued)

FOREIGN PATENT DOCUMENTS

CN         2865159 Y     1/2007
CN       101075697 A    11/2007
(Continued)

*Primary Examiner* — Lam T Mai
(74) *Attorney, Agent, or Firm* — Rimon PC

(57) ABSTRACT

This application provides a CPE device that includes: a housing, an omnidirectional antenna, a communications module, a PCB, and a heat sink. The omnidirectional antenna is connected to an input end of the communications module, an output end of the communications module is connected to the PCB. An output end of the PCB is connected to an Ethernet cable, and the PCB is disposed on the heat sink. The communications module is configured to convert a received radio-frequency signal to a digital signal. The housing is a cylindrical structure with an opening formed at a lower end. The omnidirectional antenna, the communications module, and the PCB are disposed inside the housing. The heat sink is disposed at the lower end of the housing, and a through hole for the Ethernet cable to pass through is disposed on the heat sink.

19 Claims, 6 Drawing Sheets

(51) Int. Cl.
*H01Q 1/22* (2006.01)
*H01Q 1/24* (2006.01)
*H04L 12/28* (2006.01)

(56) References Cited

U.S. PATENT DOCUMENTS

| | | |
|---|---|---|
| 2014/0219177 A1 | 8/2014 | Aguirre et al. |
| 2016/0079665 A1* | 3/2016 | Norin ................. H01Q 3/06 342/359 |
| 2020/0184071 A1* | 6/2020 | Frick .................. G06F 16/1734 |

FOREIGN PATENT DOCUMENTS

| | | |
|---|---|---|
| CN | 201112543 Y | 9/2008 |
| CN | 204014096 U | 12/2014 |
| CN | 105217049 A | 1/2016 |
| CN | 105281049 A | 1/2016 |
| CN | 205029023 U | 2/2016 |
| CN | 205377920 U | 7/2016 |

* cited by examiner

CUSTOMER PREMISES EQUIPMENT (CPE), CPE MOUNTING BRACKET, AND CPE SYSTEM

CROSS-REFERENCE TO RELATED APPLICATIONS

This application is a continuation of International Application No. PCT/CN2018/109407, filed on Oct. 9, 2018, which claims priority to Chinese Patent Application No. 201710936999.4 filed on Oct. 10, 2017. The disclosures of the aforementioned applications are hereby incorporated by reference in their entireties.

TECHNICAL FIELD

This application relates to communications technologies, and in particular, to customer premises equipment (CPE), a CPE mounting bracket, and a CPE system.

BACKGROUND

Customer premises equipment (CPE) is a wireless broadband access device that converts a high-speed long term evolution (LTE) signal to a general WiFi signal to be used by a mobile terminal such as a tablet computer, a smart phone, or a notebook computer. A CPE device may simultaneously support a plurality of terminals in accessing a network, and is a data backhaul device that transmits user video or data back to a public network or a private network through a wireless LTE signal, which then transmits the user video or data to a customer data processing center.

At present, when an outdoor CPE is installed, the antenna direction needs to be adjusted to achieve an optimal signal receiving effect, and a proper ground point must be found to implement ground protection for the CPE. Also, the pole must be customized, and the CPE must be installed at a proper outdoor location using a screw or a hose clamp and the customized pole.

The installation process of an outdoor CPE needs an expert to adjust the antenna direction, find the proper ground point and customize the dedicated pole. This makes the installation process complex and relatively high costs.

SUMMARY

This application provides CPE, a CPE mounting bracket, and a CPE system, to resolve the foregoing problem that installation of outdoor CPE needs an expert to adjust an antenna direction, and find a proper ground point and a dedicated pole, and that this causes a complex installation process and relatively high costs.

According to a first aspect, this application provides CPE, including:

a housing, an omnidirectional antenna, a communications module, a printed circuit board (PCB) and a heat sink, where the omnidirectional antenna is connected to an input end of the communications module, an output end of the communications module is connected to the PCB, an output end of the PCB is connected to an Ethernet cable, and the PCB is disposed on the heat sink, where heat is dissipated through the heat sink; the communications module is configured to convert a received radio-frequency signal to a digital signal;

the housing is a cylindrical structure with an opening formed at a lower end of the housing, and the omnidirectional antenna, the communications module, and the PCB are disposed inside the housing; and the heat sink is disposed at the lower end of the housing, and a through hole for the Ethernet cable to pass through is disposed on the heat sink.

Optionally, the heat sink and the Ethernet cable are fastened through sealing.

In this solution, the omnidirectional antenna is disposed in the CPE to achieve 360-degree coverage for the CPE. In the installation process, there is no need to adjust an antenna direction by an expert, so the installation process is simple, and installation costs are relatively low.

In addition, the heat sink can dissipate the heat from the PCB board, to prevent faults such as circuit burnout caused by a high temperature due to operating or a high temperature environment, and to improve performance of the CPE.

Optionally, a PG (panzergewinde) waterproof connector is used for waterproof sealing of the Ethernet cable.

In a specific implementation, the housing is an insulating material. An insulation housing can prevent the CPE from being struck by lightning to some extent.

The housing of the CPE is made of insulating material such as a plastic, and can effectively avoid problems such as a short circuit caused by lightning in an outdoor environment, and can implement a function of floating ground surge protection.

In another specific implementation of the CPE, a connection structure is disposed at the lower end of the housing or on the heat sink, and the connection structure is configured to be detachably connected to a CPE mounting bracket.

In this solution, to further implement simplification of an installation operation, the connection structure that is matched with and is detachably connected to the mounting bracket may be disposed on the CPE. For example, the CPE may be fastened to the CPE mounting bracket, or connected to the CPE mounting bracket in a thread-connected manner, or connected to the CPE mounting bracket through a structure such as a screw. In addition, the connection structure may be disposed at the lower end of the housing. When the heat sink is disposed at a bottom of the housing to serve as a bottom casing, the connection structure may also be disposed on the heat sink. This is not limited in this solution.

In a specific implementation, the heat sink may be a metal heat sink, and may also serve as a bottom casing of the CPE.

Optionally, the connection structure is a fastening slot, and the fastening slot is configured to be fastened to the CPE mounting bracket.

Based on any one of the foregoing solutions, a sealing kit is disposed between the heat sink and the housing.

Because the CPE is installed outdoors, and the outdoor environment is variable, to ensure reliability and security of the operation of the CPE, the CPE needs to be dustproof and waterproof. Therefore, the bottom of the housing may be sealed, and the sealing kit may be disposed between the heat sink and the housing. For example, a sealing ring may be used and a groove is disposed inside the housing. In an installation process, a periphery of the heat sink is covered with the sealing ring, and the heat sink is disposed inside the groove, and the like. This is not limited in this solution.

Optionally, an outer edge of the heat sink is provided with a sealing groove, and the sealing ring and the cylindrical housing are disposed to cooperate to perform water resistance and sealing.

Optionally, an outer face shield of the metal heat sink is covered or isolated by a plastic attachment plate, to ensure that the CPE has no metal leakage. The CPE is insulated from a metal mounting part, or a plastic mounting part is used for insulated isolation.

Based on any one of the foregoing solutions, the omnidirectional antenna includes a plurality of directional antennas, and the plurality of directional antennas are arranged in sequence as a columnar polyhedron. The directional antennas facing a plurality of directions can cover all angles, achieving omnidirectional coverage.

In the prior art, only a particular range can be covered by using a directional antenna, and to achieve signal receiving, an expert needs to make an adjustment. In the present solutions, the plurality of directional antennas are arranged to form an omnidirectional antenna that can cover a larger range of angle. Also, in the installation process of the CPE, the process of adjusting an antenna angle and optimizing a signal is not required, thereby reducing labor costs and improving installation efficiency.

Optionally, in a specific implementation, the omnidirectional antenna includes four directional antennas arranged in sequence, and the arranged four directional antennas form a columnar tetrahedron, to achieve 360-degree omnidirectional coverage.

In this solution, a directional antenna is formed by using an omnidirectional antenna and a reflection panel, and a square or polygonal omnidirectional antenna is formed by using four or more groups of directional antennas, so that in the installation process, there is no need to adjust an antenna angle and optimize a signal.

Optionally, the housing is a cylinder with an opening formed at a lower end.

A cylindrical housing is used for the CPE provided in this solution, and this is more beneficial for a layout of the omnidirectional antenna.

Optionally, the CPE further includes: an indoor mounting bracket, where a mounting structure is disposed at an upper end of the indoor mounting bracket and is configured to be detachably connected to the connection structure.

In this solution, the indoor mounting bracket may be directly placed indoors, and the CPE can be detachably installed on the indoor mounting bracket, to implement indoor installation and application of the CPE.

According to a second aspect, this application provides a CPE mounting bracket, including:

a mounting base, a support tube, and an attachment plate, where a connection structure is disposed at an upper end of the attachment plate, and the connection structure is configured to be detachably connected to a CPE;

an upper end of the support tube is connected to a lower end of the attachment plate, and a cavity of the support tube is connected to an internal cavity of the attachment plate, so that an Ethernet cable of the CPE may pass through the cavity of the support tube; and a lower end of the support tube is connected to the mounting base, and an angle between the support tube and the mounting base is adjustable; and an opening is formed at the lower end of the support tube, so that the Ethernet cable of the CPE passes through the opening.

The CPE mounting bracket provided in this solution is configured to install the CPE provided in any solution of the foregoing first aspect, the mounting bracket and the CPE cooperate to achieve detachable installation, and the Ethernet cable of the CPE may pass through the attachment plate of the mounting bracket and the cavity of the support tube and is not directly exposed outside, so that in addition to protecting the Ethernet cable from damage from an environment, floating ground surge protection may be further achieved.

Optionally, the connection structure includes a fastening hook, and the fastening hook is configured to be fastened to a fastening slot disposed at a lower end of a housing of the CPE or on a heat sink.

Optionally, the connection structure further includes an anti-loosening structure, and the anti-loosening structure is configured to prevent a connection between the fastening hook and the fastening slot from becoming loose.

Optionally, the support tube is a hollow elbow tube.

Optionally, a leveling bubble is disposed inside the attachment plate, and the leveling bubble is configured to adjust the attachment plate to a vertical position.

Optionally, an insulating material is used in a connected position of the attachment plate and the CPE.

To implement a requirement for stability and strength, commonly-used materials of the mounting base and the support tube are metal. To prevent impact on the CPE, an insulated connection needs to be used between the CPE mounting bracket and the CPE, that is, the attachment plate may be made from the insulating material, or a part of the attachment plate in contact with the CPE is made from the insulating material.

According to a third aspect, this application provides a CPE system, including: the CPE provided in any solution of the first aspect and the CPE mounting bracket provided in any solution of the second aspect.

According to the CPE, the CPE mounting bracket, and the CPE system provided in this application, the CPE and the CPE mounting bracket achieve a detachable connection, the angle of the mounting bracket is adjustable, and the omnidirectional antenna is used for the CPE to achieve 360-degree omnidirectional coverage. In an installation process, there is no need to adjust an antenna direction by an expert, and the detachable installation is convenient and efficient. The installation process is simple, and the installation efficiency is effectively improved.

DESCRIPTION OF EMBODIMENTS

As a wireless broadband access device, outdoor CPE needs professional installation, and requires a plurality of installation procedures such as establishment of a pole, installation, antenna optimization, and grounding surge protection. Long installation time, high professional requirement, and high total installation costs make it difficult to promote outdoor CPE. A future development trend of the outdoor CPE is an antenna that does not require optimization, achieves surge protection without grounding, eliminates establishment of a pole, and at the same time is easy to install. At present, installation of a directional antenna, grounding surge protection, and pole installation are required in the current scheme of establishing outdoor CPE. However, there are the following problems in the current scheme:

signal optimization: a directional antenna needs adjustment of an antenna direction, and a signal optimization time is more than 1 h;

grounding surge protection: finding a ground point is difficult, and a grounding operation is complex; and pole installation: in many scenarios, a pole needs to be customized, and the customization period is long and the costs are high. Also screw or hose clamp installation is a complex installation process and requires a long time.

Based on the problems in the existing solution, this application provides novel CPE and a novel CPE mounting bracket, so that convenient and efficient installation of the CPE can be achieved, and there is no need to adjust an antenna angle and optimize a signal by an expert. The CPE, the CPE mounting bracket, and a system are described below using an implementation embodiment.

In this application, it should be understood that, CPE is a wireless terminal access device, and is a device that converts a received analog signal of a base station or another network device to a WiFi signal, and may be connected to a plurality of specific subordinate service devices. A specific name is not limited to the CPE, and there may be another name. This is not limited in this solution.

Figure 1:
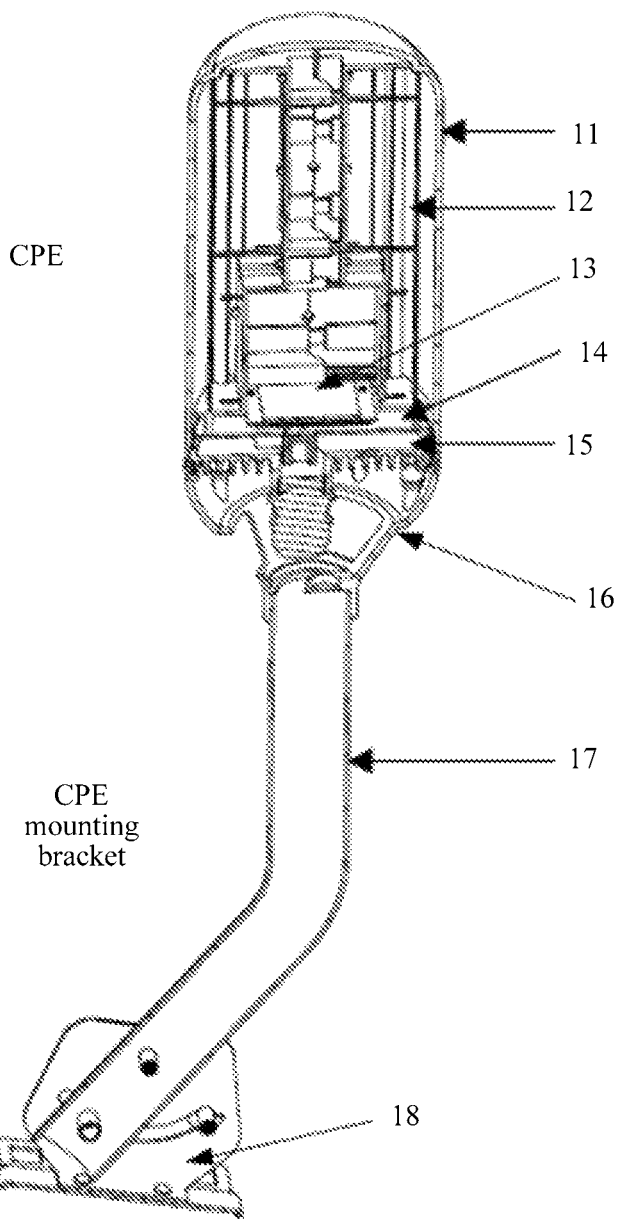
FIG. 1 is a schematic structural diagram of a CPE system according to this application.

FIG. 1 is a schematic structural diagram of a CPE system according to this application. As shown in FIG. 1, the CPE system at least includes CPE and a CPE mounting bracket, where the CPE mounting bracket is configured to have the CPE installed at a proper location to receive an LTE signal. After receiving the LTE signal, the CPE converts the LTE signal into a WiFi signal and outputs the WiFi signal to an indoor device, such as a router, so that another user device may be connected to a network on the router to transmit data.

As shown in FIG. 1, the CPE provided in this application includes:

a housing 11, an omnidirectional antenna 12, a communications module 13, a PCB 14, and a heat sink 15, where the omnidirectional antenna 12 is connected to an input end of the communications module 13, an output end of the communications module 13 is connected to the PCB 14, an output end of the PCB 14 is connected to an Ethernet cable, and the PCB 14 is disposed on the heat sink 15, where the PCB dissipates heat through the heat sink; and the communications module 13 is configured to convert a received radio-frequency signal to a digital signal. The PCB 14 is configured to transfer the signal output from the communications module to the Ethernet cable, and in addition, functions such as power supply and circuit protection are implemented through the PCB. For example, the PCB is provided with a power supply module, a protective circuit, and the like, to assist the communications module and the omnidirectional antenna in implementing a function converting an analog signal into a WiFi signal.

The housing 11 is a cylindrical structure with an opening formed at a lower end. The cylindrical structure may be a cylinder, or a polyhedral column cylinder. This is not limited herein. The omnidirectional antenna 12, the communications module 13, and the PCB 14 are disposed inside the housing 11. To achieve airtightness, security, and the like, the housing 11 may be a fully sealed cylindrical structure with an opening formed at a lower end. Optionally, the housing 11 may be a structure integrally formed.

The communications module in this solution can convert an existing network standard signal received by the omnidirectional antenna or a signal of a new communications system. This is applicable to a conventional 2G, 3G, and LTE network system, and may also be used for a new radio (new radio, NR) network system (or referred to a 5G system), or other network systems in the future. The communication module can also convert an analog signal received through the antenna into a digital signal, but a specific network system is not limited in this solution.

The heat sink 15 is disposed at the lower end of the housing, and a through hole for the Ethernet cable to pass through is disposed on the heat sink 15. In a specific implementation, to ensure security of using the CPE outdoors, the heat sink 15 and the Ethernet cable are fastened through sealing.

In the CPE provided in this embodiment, the omnidirectional antenna may be used to receive signals from all directions of 360 degrees, and in an installation process, there is no need to adjust an antenna direction by an expert, and using detachable installation is convenient and efficient, so the installation process is simple, and installation efficiency is effectively improved.

Based on the foregoing embodiment, optionally, a PG waterproof connector for waterproof sealing is used for the Ethernet cable.

In this solution, it should be understood that the heat sink 15 may directly serve as a bottom casing of the CPE and is installed at the lower end of the housing 11. The through hole for the Ethernet cable to pass through is disposed on the heat sink 15, and a gap between the through hole of the heat sink 15 and the Ethernet cable is sealed. Optionally, the bottom casing of the CPE can be disposed additionally. This is not limited in this solution.

In addition, the heat sink 15 can dissipate heat from the PCB board, to prevent faults such as circuit burnout caused by a high temperature due to operating or a high temperature environment, and improve performance of the CPE.

In a specific implementation, the housing 11 is made of an insulating material, and can prevent the CPE from being struck by lightning. The housing 11 of the CPE is made of an insulating material such as a plastic, and can effectively avoid problems such as a short circuit caused by lightning in an outdoor environment, to achieve the function of floating ground surge protection. There is no need to specifically find a proper grounding point, and there is no need to perform grounding processing particularly.

Optionally, the housing 11 of the CPE may be made from an outdoor plastic with a wall thickness of 3 mm and voltage resistance of more than 10 kv. A single board is flat installed at a bottom of a module, and a metal heat sink is disposed at the bottom and attached on the PCB single board to dissipate the heat. An external surface of the metal heat sink may be covered by a plastic attachment plate and achieve insulation with a mounting part, so that the floating ground surge protection free from grounding is implemented for the CPE.

Optionally, in a specific implementation, the housing 11 may be a cylinder with an opening formed at a lower end. The cylindrical housing is used for the CPE, and this is more beneficial for a layout of the omnidirectional antenna.

According to the CPE provided in this solution, the omnidirectional antenna is disposed in the CPE to achieve 360-degree coverage for the CPE. In an installation process, there is no need to adjust an antenna direction by an expert, so that the installation process is simple, and installation costs are relatively low.

Based on the foregoing solution, in a specific implementation of the CPE, a connection structure is disposed at the lower end of the housing 11 or on the heat sink 15, and the connection structure is configured to be detachably connected to a CPE mounting bracket.

In this solution, in a specific implementation, the heat sink 15 may be a metal heat sink, and may also serve as a bottom casing of the CPE. To further implement simplification of an installation operation, the connection structure that is matched with and is detachably connected to the mounting bracket may be disposed on the CPE. For example, the CPE may be fastened to the CPE mounting bracket, or connected to the CPE mounting bracket in a thread-connected manner, or connected to the CPE mounting bracket through a structure such as a screw. In addition, the connection structure may be disposed at the lower end of the housing 11. When the heat sink 15 is disposed at a bottom of the housing 11 to serve as the bottom casing, and the connection structure may also be disposed on the heat sink 15. This is not limited in this solution.

A threaded connection is used as an example. An outer side of the bottom of the housing 11 may be provided with an outer screw thread, and an inner side of the attachment plate of a CPE mounting structure is provided with an inner screw thread matched with the outer screw thread. Alternatively, an inner side of the bottom of the housing 11 is provided with an inner screw thread, and an outer side of the attachment plate of a CPE mounting structure is provided with an outer screw thread matched with the inner screw thread of the housing 11. If the heat sink 15 is used as the bottom casing of the CPE, the heat sink may also be provided with a screw thread. This is not limited in this solution.

In a specific implementation, the connection structure is a fastening slot, and the fastening slot is configured to be fastened to the CPE mounting bracket.

Based on any one of the foregoing solutions, a sealing kit is disposed between the heat sink 15 and the housing 11.

Because the CPE is installed outdoors, and the outdoor environment is variable, to ensure reliability and security of an operation of the CPE, the CPE needs to be dustproof and waterproof. Therefore, the bottom of the housing 11 may be sealed, the sealing kit may be disposed between the heat sink 15 and the housing 11, for example, including a sealing ring, a sealing cushion, and the like. A sealing groove is disposed in an outer periphery of the heat sink, and waterproof sealing is achieved by placing the sealing ring and the cylindrical housing to cooperate. The sealing ring is used as an example, and a groove may be disposed inside the housing. In an installation process, a periphery of the heat sink is covered with the sealing ring, and then the heat sink is disposed inside the groove, and the like. This is not limited in this solution.

Optionally, an outer face shield of the metal heat sink is covered or isolated by a plastic attachment plate, to ensure that the CPE has no metal leakage. The CPE is insulated from a metal mounting part, or a plastic mounting part is used for insulated isolation.

Figure 2A:
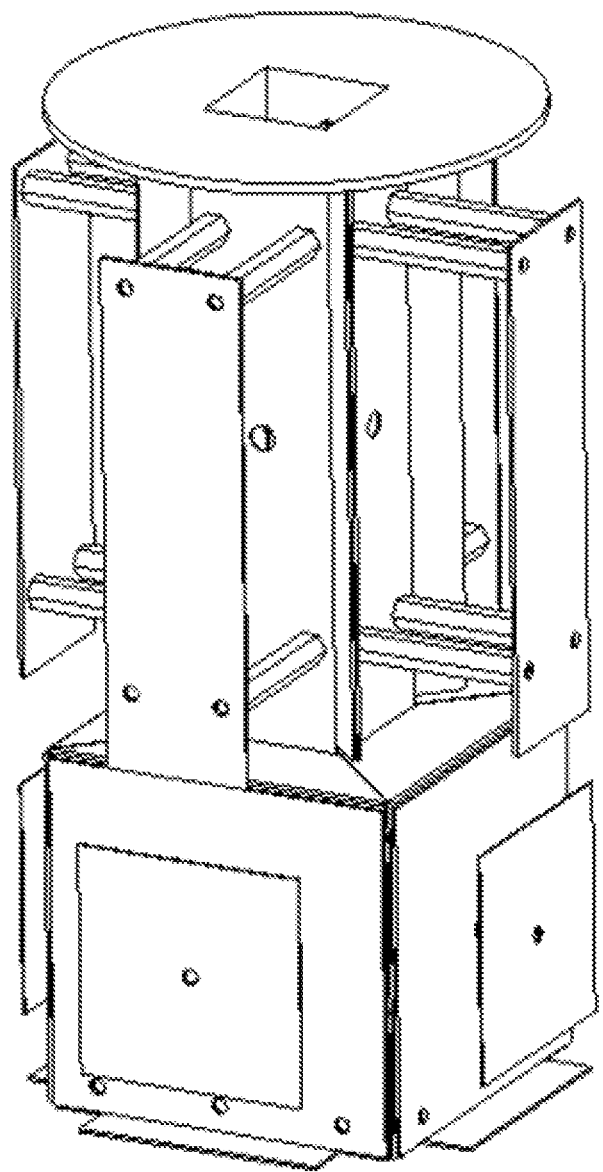
FIG. 2a is a schematic structural diagram of an omnidirectional antenna of a CPE according to this application.
Figure 2B:
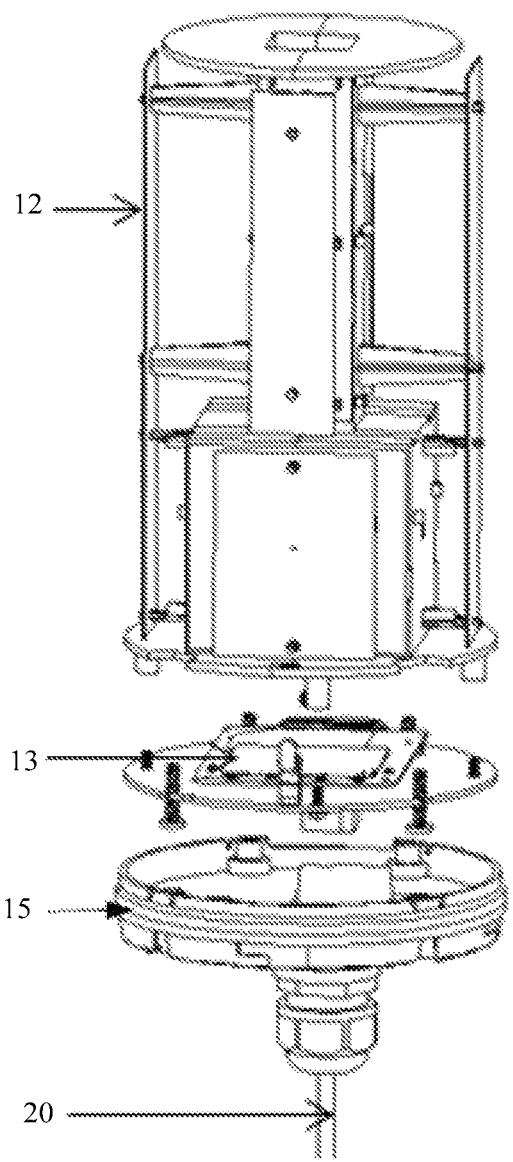
FIG. 2b is a schematic structural diagram of another structure inside a housing of a CPE according to this application.

FIG. 2a is a schematic structural diagram of an omnidirectional antenna in the CPE according to this application; and FIG. 2b is schematic structural diagram of another structure inside a CPE housing according to this application. As shown in FIG. 2a and FIG. 2b, based on any one of the foregoing solutions, the omnidirectional antenna includes a plurality of directional antennas, and the plurality of directional antenna are arranged in sequence to form a cylindrical polyhedron, so that directional antennas facing a plurality of directions can achieve omnidirectional coverage, and cover each angle to better receive a signal. In FIG. 2a and FIG. 2b, four directional antennas arranged in sequence are used as an example to form an omnidirectional antenna that is a square cylinder and can cover 360 degrees.

In the prior art, only a particular range can be covered by using a directional antenna, and in order to achieve signal receiving, an expert needs to make manual adjustment. In the present solution, the plurality of directional antennas are arranged to form the omnidirectional antenna that can cover a larger range of angle, so that, in an installation process of the CPE, a process of adjusting an antenna angle and optimizing a signal are not required, thereby reducing labor costs and improving installation efficiency.

FIG. 2b shows a general position of another component inside the CPE housing. An omnidirectional LTE antenna 12 receives an LTE signal from a base station, converts a radio-frequency signal into a digital signal through a communications module 13, and then transmits the digital signal to a router in the home through a network cable 20. The router converts the digital signal into a WiFi signal, or a terminal device such as a computer is connected by directly using a LAN port of the router, thereby achieving wireless broadband access (compared with optical fiber and copper wire to home, the wireless broadband access is more convenient and fast).

In this solution, a directional antenna is formed by using an omnidirectional antenna and a reflection panel, and a square or polygonal omnidirectional antenna is formed by using four or more groups of directional antennas, so that in the installation process, there is no need to adjust an antenna angle or optimize a signal, and the installation efficiency is improved.

Figure 3:
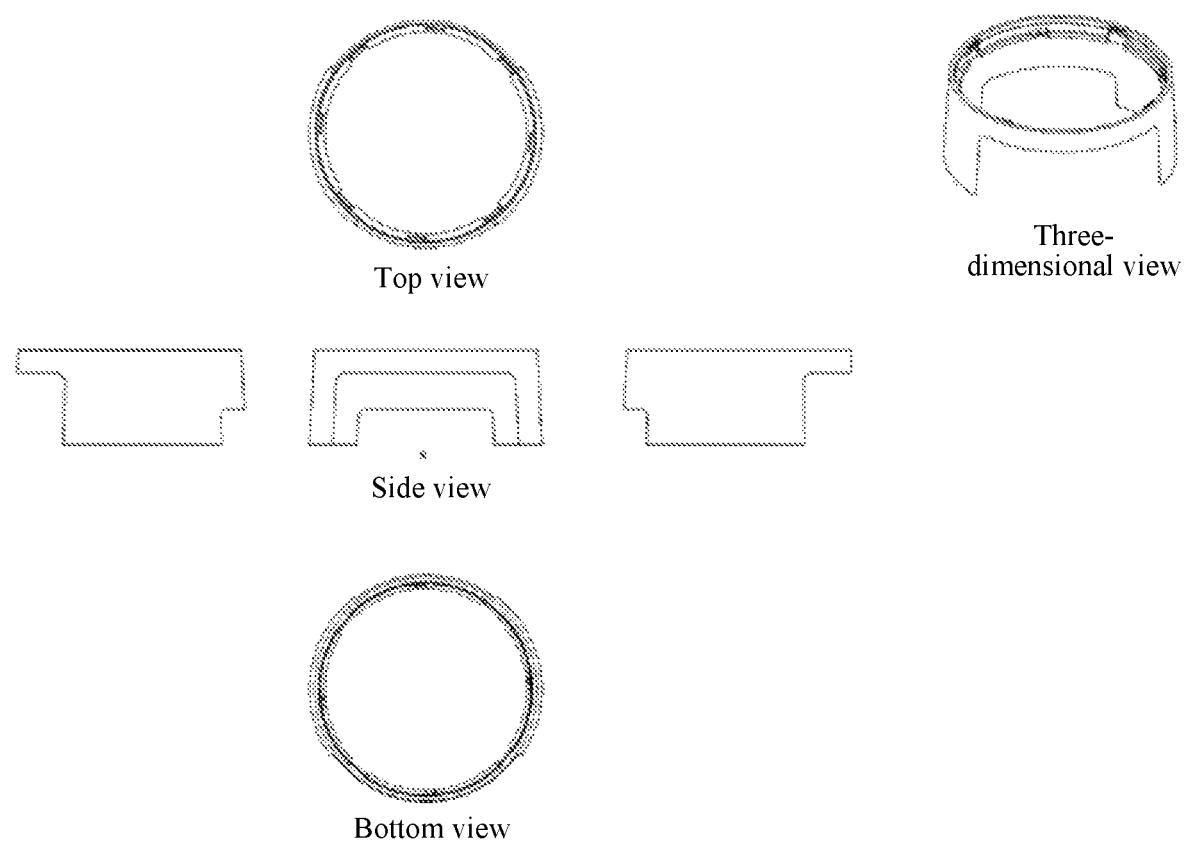
FIG. 3 is a schematic structural diagram of an indoor mounting base of a CPE according to this application.

FIG. 3 is a schematic structural diagram of an indoor mounting base of CPE according to this application. As shown in FIG. 3, based on any one of the foregoing solutions, the CPE may further include: an indoor mounting bracket, where a mounting structure is disposed at an upper end of the indoor mounting bracket and is configured to be detachably connected to the connection structure.

Optionally, the indoor mounting bracket may be fastened to the lower end of the housing or the heat sink, or may be connected through a screw thread. This is not limited in this solution, it is convenient for a user to implement installation. As shown in FIG. 3, a lower end of an indoor mounting base may be provided with three or more support parts to ensure stability.

In this solution, the indoor mounting bracket may be directly placed indoors, and the CPE is detachably installed on the indoor mounting bracket, to implement indoor installation and application of the CPE.

Figures 4A, 4B, 4C:
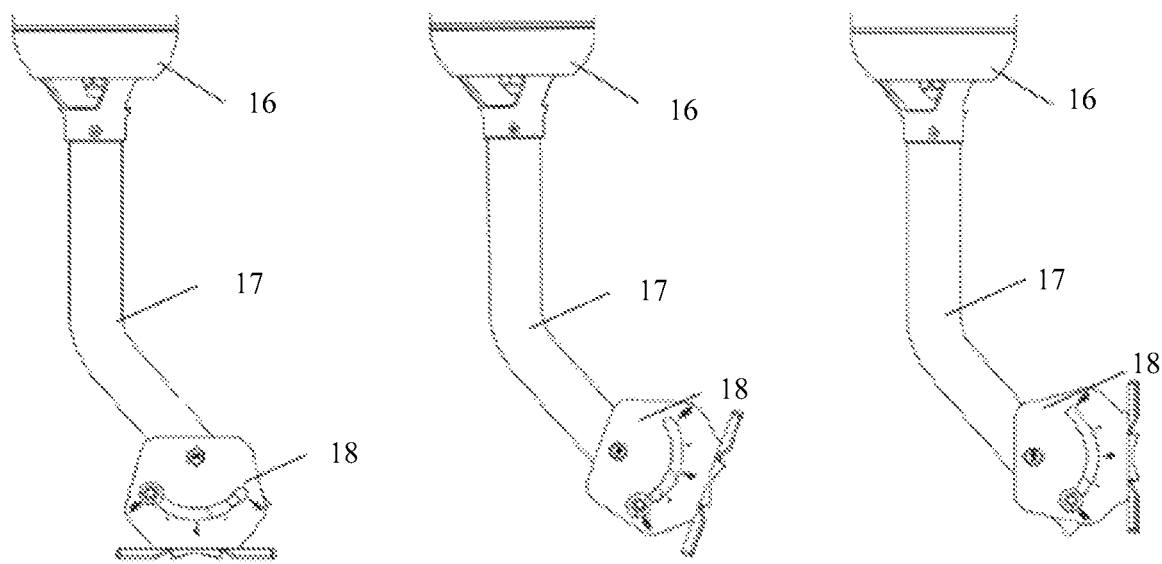
FIG. 4(a) to FIG. 4(c) are schematic diagrams of installable positions of a CPE mounting bracket according to this application.
Figure 5:
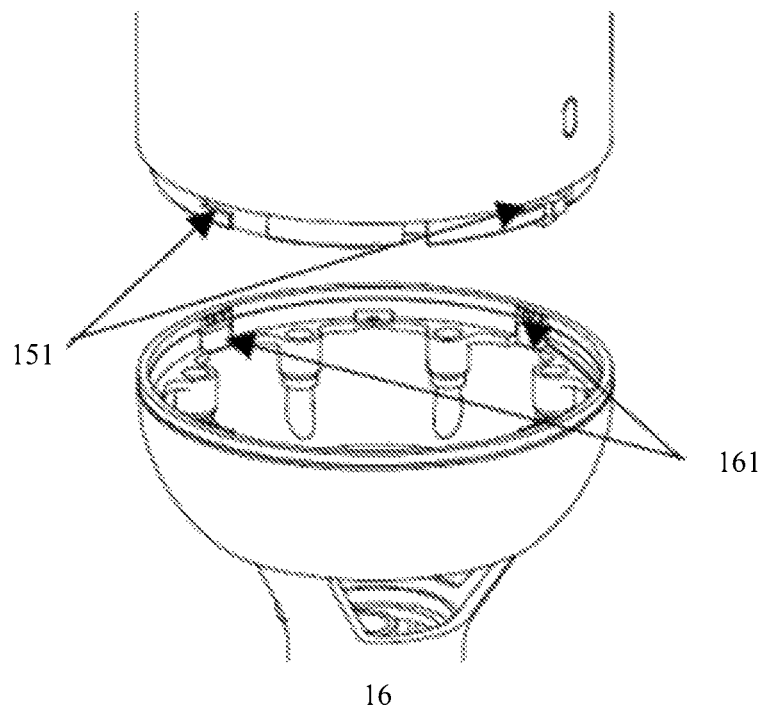
FIG. 5 is a schematic structural diagram of a connection of a CPE and a CPE mounting bracket according to this application.
Figure 6:
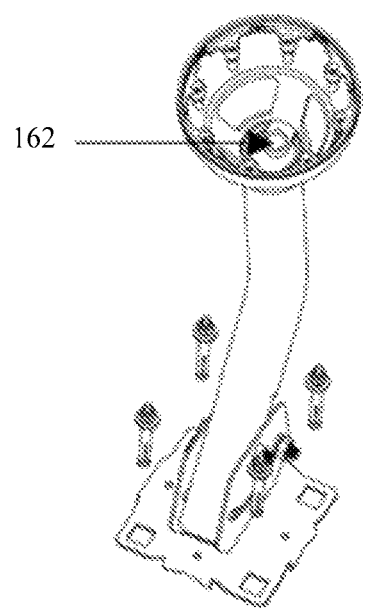
FIG. 6 is a schematic diagram of an inner structure of an attachment plate of a CPE mounting bracket according to this application.
Figure 7A:
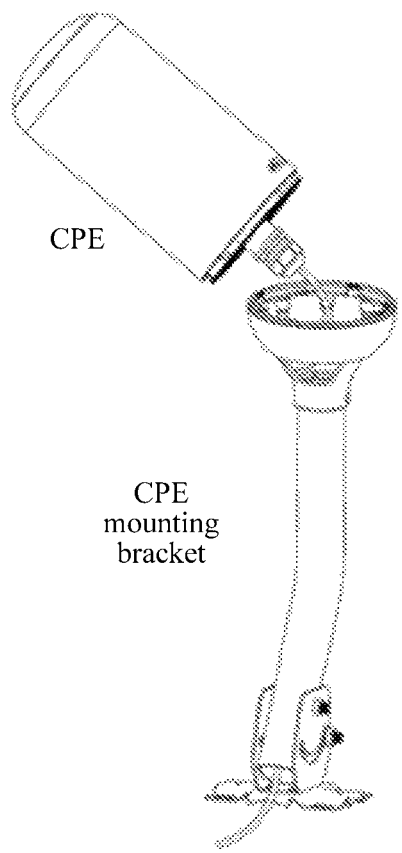
FIG. 7(a) and FIG. 7(b) are schematic diagrams of installation of a CPE and a CPE mounting bracket according to this application.
Figure 7B:
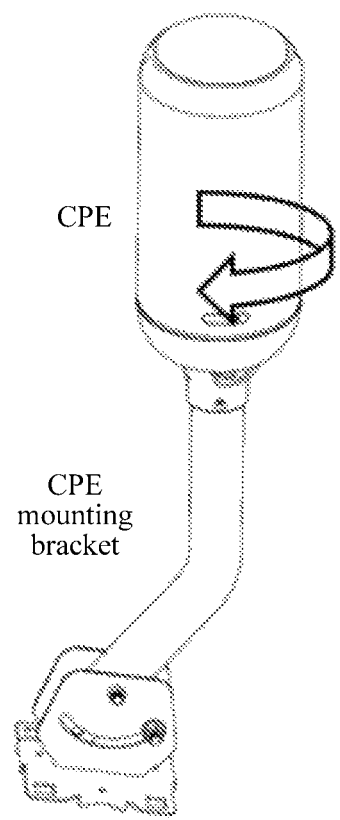

FIG. 4(a) to FIG. 4(c) are schematic diagrams of installable positions of a CPE mounting bracket according to this application. FIG. 5 is a schematic structural diagram of a connection of CPE and a CPE mounting bracket according to this application. FIG. 6 is a schematic diagram of an inner structure of an attachment plate of a CPE mounting bracket according to this application. A shown in FIG. 4(a) to FIG. 6, the CPE mounting bracket includes:

a mounting base 18, a support tube 17, and an attachment plate 16;

a connection structure is disposed at an upper end of the attachment plate 16, and the connection structure is configured to be detachably connected to a housing of the CPE;

an upper end of the support tube 17 is connected to a lower end of the attachment plate 16, and a cavity of the support tube 17 is connected to an internal cavity of the attachment plate 16, so that an Ethernet cable of the CPE may pass through the cavity of the support tube;

a lower end of the support tube 17 is connected to the mounting base 18, and an angle between the support tube 17 and the mounting base 18 is adjustable; and an opening is formed at the lower end of the support tube 17 (as shown in FIG. 7(*a*)). Optionally, the opening may also be disposed on a side wall of a bottom of the support tube 17, so that the Ethernet cable of the CPE passes through the opening.

The CPE may be disposed on a horizontal plane by using this solution, for example, FIG. 4(*a*); or the CPE may be installed on a sloping wall, for example, FIG. 4(*b*); or the CPE may be installed on a vertical wall, for example, FIG. 4(*c*), and the angle between the support tube 17 and the mounting base 18 may be adjusted based on an actual requirement.

The CPE mounting bracket provided in this embodiment is configured to install the CPE provided in any solution of the foregoing embodiment, the mounting bracket and the CPE cooperate to achieve detachable installation, and the Ethernet cable of the CPE may pass through the attachment plate of the mounting bracket and the cavity of the support tube and is not directly exposed outside, so that in addition to protecting the Ethernet cable from damage from an environment, floating ground surge protection may be further achieved, and there is no need to specially customize a pole. Therefore, installation becomes convenient, and costs are reduced. In addition, installation efficiency is improved.

Based on the foregoing embodiment, the connection structure on the attachment plate 16 may be a screw thread or a fastening structure matched with the bottom of the CPE, or may be a screw, a screw nut, or the like. This is not limited in this solution.

In a specific implementation, the connection structure includes a fastening hook, and the fastening hook is configured to be fastened to a fastening slot disposed at a lower end of the housing of the CPE or on a heat sink.

Optionally, the connection structure further includes an anti-loosening structure, and the anti-loosening structure is configured to prevent a connection between the fastening hook and the fastening slot from becoming loose.

In the foregoing solution, the anti-loosening structure may be formed by grooves separately disposed on the attachment plate and the CPE, and cylinders matched with the grooves, or another structure can prevent loosening after the CPE is fastened to a mounting structure. This is not limited in this solution. As shown in FIG. 5, the anti-loosening structure includes a bulge 161 disposed in an inner side of an upper end of the attachment plate, and a groove 151 disposed at an outer side of the lower end of the CPE. When the CPE and the mounting bracket are assembled, the bulge 161 slides into the groove 151, so that the CPE and the mounting bracket can be prevented from becoming loose.

In an optional solution, the support tube 17 is a hollow elbow tube. As shown in FIG. 6, a lower end of the support tube 17 is installed on the mounting base 18, and a fixed plate clamping the support tube 17 may be disposed on the mounting base, and is fastened by screwing up a screw bolt or a screw. In this solution, an angle of the support tube 17 on the mounting base 18 is adjustable, and the support tube is adjusted based on an installation position or an environment to cause the CPE to be installed at a proper location.

In a specific implementation of the CPE mounting bracket, a leveling bubble is disposed inside the attachment plate 16, and the leveling bubble is configured to adjust the attachment plate to a position perpendicular to a horizontal plane. Similarly, in a process of installing the CPE, the CPE can be controlled to avoid being installed obliquely.

Optionally, an insulating material is used in a connected position of the attachment plate and the CPE.

To meet a requirement for stability and strength, commonly used materials of the mounting base and the support tube are metal. To prevent impact on the CPE, an insulated connection needs to be used between the CPE mounting bracket and the CPE, that is, the attachment plate may be made from the insulating material, or a part of the attachment plate in contact with the CPE is made from the insulating material.

Combined with any one of the foregoing solutions, a CPE system provided in this application at least includes: the CPE and the CPE mounting bracket in the foregoing solutions.

FIG. 7(*a*) and FIG. 7(*b*) are schematic diagrams of installation of CPE and a CPE mounting bracket according to this application. As shown in FIG. 7(*a*) and FIG. 7(*b*), the CPE and the CPE mounting bracket are fastened together through the fastening hook and the fastening slot provided in the foregoing embodiment: an Ethernet cable may first pass through an attachment plate and a support tube of the mounting bracket, and reach a lower end of the support tube, a mounting base of the mounting bracket is installed on a roof or another position, and the mounting base can be freely installed on a plane, a slope roof and a vertical wall without a pole by using an angle-adjustable bracket mounting part, to reduce costs of customizing the pole. After the CPE mounting bracket is fastened at a chosen position (for example, the roof), the lower end of the CPE and the attachment plate of the CPE mounting bracket are abutted, and then fastening is performed by screwing up to fasten the CPE to the CPE mounting bracket, to complete installation of the CPE system. Quick rotation and fastening installation of the CPE is achieved through a fastening structure, to increase installation efficiency by more than three times compared with that of a hose clamp and pole installation. The Ethernet cable may be pulled into home to be connected to a router or the like.

The CPE system may further include a network cable, and/or an access point device such as a wireless or wired connected router, and may further include a terminal device such as a computer, a notebook computer, a mobile phone of a user.

According to the CPE, the CPE mounting bracket, and the CPE system provided in this application, the CPE is detachably connected to the CPE mounting bracket, and the angle of the mounting bracket is adjustable, thereby reducing the degree of difficulty of the installation. Professional installation is replaced with self-installation by a customer, and the angle-adjustable bracket mounting part is included, to avoid the problem of building the pole on spot. By using an insulating housing such as plastic to design the CPE, the floating ground surge protection is achieved, and installation ground is free, thereby resolving the problem of difficult grounding. The omnidirectional antenna is used for the CPE to achieve 360-degree coverage. In the installation process, there is no need to adjust the antenna direction by an expert, and the detachable installation is convenient and efficient, so that the installation process is simple, and installation efficiency is effectively improved.

What is claimed is:

1. Customer premises equipment (CPE), comprising:
a housing, an omnidirectional antenna, a communications module, a printed circuit board (PCB) and a heat sink, wherein
the omnidirectional antenna is connected to an input end of the communications module, an output end of the communications module is connected to the PCB, an output end of the PCB is connected to an Ethernet cable, and the PCB is disposed on the heat sink; the communications module is configured to convert a received radio-frequency signal to a digital signal;
the housing is a cylindrical structure with an opening formed at a lower end, and the omnidirectional antenna, the communications module, and the PCB are disposed inside the housing; and
the heat sink is disposed at the lower end of the housing, and a through hole for the Ethernet cable to pass through is disposed on the heat sink.

2. The CPE according to claim 1, wherein the housing is made of an insulating material.

3. The CPE according to claim 1, wherein a connection structure is disposed at the lower end of the housing or on the heat sink, and the connection structure is configured to be detachably connected to a CPE mounting bracket.

4. The CPE according to claim 3, wherein the connection structure is a fastening slot, and the fastening slot is configured to be fastened to the CPE mounting bracket.

5. The CPE according to claim 1, wherein the heat sink and the Ethernet cable are fastened through sealing.

6. The CPE according to claim 1, wherein a sealing kit is disposed between the heat sink and the housing.

7. The CPE according to claim 1, wherein the omnidirectional antenna comprises a plurality of directional antennas, and the plurality of directional antennas are arranged in sequence as a columnar polyhedron.

8. The CPE according to claim 7, wherein the omnidirectional antenna comprises four directional antennas arranged in sequence, and the arranged four directional antennas form a columnar tetrahedron.

9. The CPE according to claim 1, wherein the housing is a cylinder with an opening formed at a lower end.

10. The CPE according to claim 3, wherein the CPE further comprises: an indoor mounting bracket, wherein a mounting structure is disposed at an upper end of the indoor mounting bracket and is configured to be detachably connected to the connection structure.

11. A customer premises equipment (CPE) mounting bracket, comprising:
a mounting base, a support tube and an attachment plate, wherein
a connection structure is disposed at an upper end of the attachment plate, and the connection structure is configured to be detachably connected to a CPE, wherein the connection structure comprises a fastening hook, and the fastening hook is configured to be fastened to a fastening slot disposed at a lower end of a housing of the CPE or on a heat sink;
an upper end of the support tube is connected to a lower end of the attachment plate, and a cavity of the support tube is connected to an internal cavity of the attachment plate, so that an Ethernet cable of the CPE can pass through the cavity of the support tube;
a lower end of the support tube is connected to the mounting base, and an angle between the support tube and the mounting base is adjustable; and an opening is formed at the lower end of the support tube, so that the Ethernet cable of the CPE passes through the opening.

12. The CPE mounting bracket according to claim 11, wherein the connection structure further comprises an anti-loosening structure, and the anti-loosening structure is configured to prevent a connection between the fastening hook and the fastening slot from becoming loose.

13. The CPE mounting bracket according to claim 11, wherein the support tube is a hollow elbow tube.

14. The CPE mounting bracket according to claim 11, wherein a leveling bubble is disposed inside the attachment plate, and the leveling bubble is configured to indicate the attachment plate in relation to a vertical position.

15. The CPE mounting bracket according to claim 11, wherein an insulating material is used in a connected position of the attachment plate and the CPE.

16. A customer premises equipment (CPE) system, comprising: a CPE and a CPE mounting bracket, wherein:
the CPE comprises a housing, an omnidirectional antenna, a communications module, a printed circuit board (PCB) and a heat sink, wherein the omnidirectional antenna is connected to an input end of the communications module, an output end of the communications module is connected to the PCB, an output end of the PCB is connected to an Ethernet cable, and the PCB is disposed on the heat sink; the communications module is configured to convert a received radio-frequency signal to a digital signal; the housing is a cylindrical structure with an opening formed at a lower end, and the omnidirectional antenna, the communications module, and the PCB are disposed inside the housing; and the heat sink is disposed at the lower end of the housing, and a through hole for the Ethernet cable to pass through is disposed on the heat sink; and
the CPE mounting bracket comprises a mounting base, a support tube and an attachment plate, wherein a first connection structure is disposed at an upper end of the attachment plate, and the first connection structure is configured to be detachably connected to a CPE; an upper end of the support tube is connected to a lower end of the attachment plate, and a cavity of the support tube is connected to an internal cavity of the attachment plate, so that an Ethernet cable of the CPE can pass through the cavity of the support tube; a lower end of the support tube is connected to the mounting base, and an angle between the support tube and the mounting base is adjustable; and an opening is formed at the lower end of the support tube, so that the Ethernet cable of the CPE passes through the opening.

17. The CPE system according to claim 16, wherein the housing is made of an insulating material.

18. The CPE system according to claim 16, wherein a second connection structure is disposed at the lower end of the housing or on the heat sink, and the connection structure is configured to be detachably connected to a CPE mounting bracket.

19. The CPE system according to claim 18, wherein the second connection structure is a fastening slot, and the fastening slot is configured to be fastened to the CPE mounting bracket.

* * * * *